Oct. 18, 1927.

W. T. SANDIFER 1,645,821

SPRING HANGER

Filed June 29, 1925

Inventor

W. T. SANDIFER,

By Townshend & Townshend

Attorney

Patented Oct. 18, 1927.

1,645,821

UNITED STATES PATENT OFFICE.

WILLIAM THOMAS SANDIFER, OF JACKSON, MISSISSIPPI.

SPRING HANGER.

Application filed June 29, 1925. Serial No. 40,472.

My invention relates to spring hangers, the primary object being the provision of an improved spring perch bolt hanger adapted for use on land vehicles of the wagon type. Another object of the invention is the provision of an improved hanger of this character constructed for use in attaching springs to the square dead axles of truck and wagon trailers, employing the regular Ford spring hanger.

With these and such other objects in view as will be apparent from the description, the invention resides in the novel construction, combination and arrangement of parts hereinafter described and claimed and illustrated in the accompanying drawings of which:—

Figure 1:
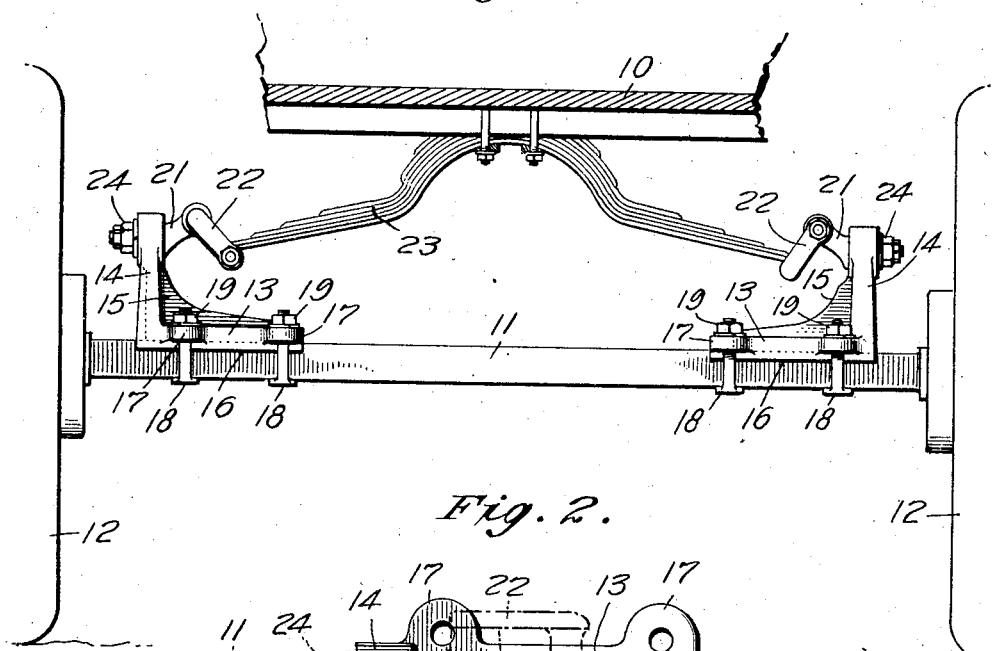
Figure 1 is an elevation of a portion of a truck trailer with my improved hanger applied.
Figure 2:
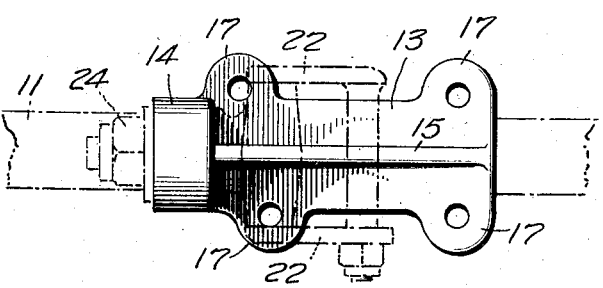
Figure 2 is a top plan view of a hanger as mounted on an axle.
Figure 3:
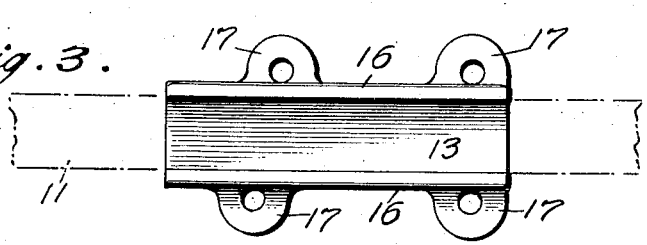
Figure 3 is a bottom plan view thereof with the fastening bolts removed.
Figure 4:
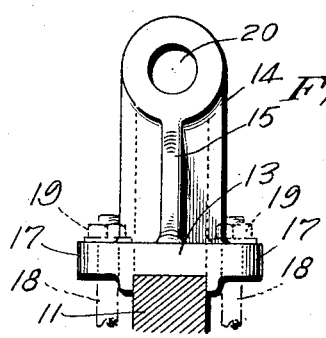
Figure 4 is an inner end elevation of the improved hanger as applied.

For purposes of illustration I have shown my invention as applied to the body of a truck or wagon trailer 10 disposed over a square dead axle 11 carrying at its opposite ends the tired wheels 12. In the manufacture of truck and wagon trailers it has heretofore proved an expensive item in manufacture to provide a spring attachment between the body of the trailer over the square dead axles with which such trailers are equipped. The regular Ford spring hanger attachment is inexpensive and ideal for this particular purpose, but it is not possible to attach the Ford hangers to the square trailer axle. My invention is designed to meet this need, and I have provided a means whereby the regular Ford spring perch bolt hangers may be attached to the square dead axles of trailers, thereby enabling a substantial reduction in the cost of manufacture and providing an extremely durable and efficient attachment.

The invention comprises a pair of supporting members, adapted to be disposed adjacent opposite ends of the axle, each of which consists of a substantially L-shaped casting having a long arm 13 and a short arm 14 extending at a right angle therefrom, said arms being reinforced by the provision of an integral centrally disposed reinforcing web 15 extending therebetween.

The long arm 13 of each supporting member is formed for disposition longitudinally over the top of the axle 11 and is provided at each of its side edges with depending flanges 16 engaging opposite sides of the axle 11 and forming in effect a channeled bottom for the supporting member whereby the same is seated on the top of the axle against lateral movement. Integral apertured laterally extending ears 17 are formed on each side of the long arm 13 for the reception therethrough of the threaded stems of a plurality of U-bolts 18 passed beneath the axle and retained by means of the securing nuts 19 whereby the supporting member may be securely clamped into engagement with the axle.

Each short arm 14 is extended upwardly from one end of the arm 13, and is provided at its upper end with a transverse bore 20 extending therethrough in the direction of the axle with its axis in parallel relation thereto. The bore 20 is formed for the reception therethrough of the stem of a Ford spring perch bolt 21 having the usual spring connection 22 attached to an end of a spring 23 disposed between the axle 11 and the body 10 of the trailer, with the spring perch being retained in position by means of the usual securing nut 24 provided therefor.

In application the dead axles are provided each with a pair of the supporting members which are positioned at opposite ends of the axle with the long arms 13 extending inwardly towards one another whereby to dispose spring hangers 22 internally of the upright arms 14 of the supports. These supporting members are preferably formed of substantial metal castings, and although I have illustrated and described certain details entering into the construction and operation of this preferred embodiment of the invention, I desire it to be understood that the invention is not to be limited thereby, but that any desired changes and modifications in the structural details may be made as will fall within the scope of the invention as claimed.

I claim:—

The combination with a rigid stationary vehicle axle of square cross section, of a spring hanger support comprising an L-shaped casting having a long arm and a short arm, an integral reinforcing web disposed in the angle between said arms, depending side flanges formed integral with each side edge of said long arm for engagement of said long arm over the top of the vehicle axle with the side flanges disposed against opposite sides of the axle, apertured ears extending laterally from opposite sides of the body portion of said long arm, U-bolts adapted to be passed beneath the axle and through said ears for clamping said long arm to the axle, and a conventional spring perch detachably secured through the upper end of said short arm and extending in parallel relation over and to said long arm and axle.

In testimony whereof I have affixed my signature.

WILLIAM THOMAS SANDIFER.